(12) United States Patent
Reiland et al.

(10) Patent No.: US 8,114,285 B2
(45) Date of Patent: Feb. 14, 2012

(54) TRI-FLOW FILTER ELEMENT WITH VENTING

(75) Inventors: Cheryl M. Reiland, Modesto, CA (US); Russell D. Jensen, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 581 days.

(21) Appl. No.: 12/302,180

(22) PCT Filed: May 24, 2007

(86) PCT No.: PCT/US2007/069652
§ 371 (c)(1),
(2), (4) Date: Nov. 24, 2008

(87) PCT Pub. No.: WO2007/140247
PCT Pub. Date: Dec. 6, 2007

(65) Prior Publication Data
US 2009/0114589 A1    May 7, 2009

Related U.S. Application Data

(60) Provisional application No. 60/803,041, filed on May 24, 2006.

(51) Int. Cl.
*B01D 35/30* (2006.01)
(52) U.S. Cl. ........ 210/248; 210/130; 210/337; 210/436; 210/437; 210/440; 210/450; 55/492
(58) Field of Classification Search .................. 210/130, 210/132, 136, 232, 235, 248, 314, 315, 322, 210/337, 338, 436–438, 440, 450, 451, 483, 484, 433.1, 472, 488; 55/480, 492
See application file for complete search history.

(56) References Cited

U.S. PATENT DOCUMENTS

| 2,598,322 | A | * | 5/1952 | Vokes ........................... 210/130 |
| 3,262,563 | A | * | 7/1966 | Pall ................................ 210/90 |
| 3,339,738 | A | * | 9/1967 | Casaleggi et al. ............. 210/136 |
| 4,036,755 | A | | 7/1977 | Dahm et al. |
| 4,283,289 | A | | 8/1981 | Meyst et al. |
| 4,502,955 | A | | 3/1985 | Schaupp |
| 4,502,956 | A | | 3/1985 | Wilson et al. |
| 4,721,563 | A | | 1/1988 | Rosean |

(Continued)

FOREIGN PATENT DOCUMENTS
DE    19519352    11/1996
(Continued)

OTHER PUBLICATIONS

International Search Report for PCT/US2007/69652 completed Nov. 14, 2007.

*Primary Examiner* — Joseph Drodge
(74) *Attorney, Agent, or Firm* — Renner, Otto, Boiselle & Sklar, LLP

(57) ABSTRACT

A filter element and assembly which has three flow paths, has particular application to a fuel supply system for a diesel engine for filtering flow from the fuel tank as well as fuel returning from the engine that is to be recirculated back to the engine. The filter element and assembly provide a third flow path for also providing for venting of both fuel paths to a drain flow path internally of the filter element.

18 Claims, 7 Drawing Sheets

U.S. PATENT DOCUMENTS

| | | | | |
|---|---|---|---|---|
| 4,909,937 | A | 3/1990 | Hoffmann et al. | |
| 5,078,876 | A | 1/1992 | Whittier et al. | |
| 5,078,877 | A | 1/1992 | Cudaback et al. | |
| 5,382,361 | A | 1/1995 | Brun | |
| 5,413,711 | A | 5/1995 | Janik | |
| 5,447,627 | A | 9/1995 | Loafman et al. | |
| 5,449,454 | A | 9/1995 | Hickok | |
| 5,453,184 | A | 9/1995 | Handtmann | |
| 5,489,384 | A | 2/1996 | Janik et al. | |
| 5,525,225 | A | 6/1996 | Janik et al. | |
| 5,753,120 | A | 5/1998 | Clausen et al. | |
| 5,846,416 | A * | 12/1998 | Gullett | 210/232 |
| 5,922,199 | A | 7/1999 | Hodgkins | |
| 5,951,862 | A | 9/1999 | Bradford | |
| 6,171,491 | B1 * | 1/2001 | Popoff et al. | 210/235 |
| 6,174,438 | B1 | 1/2001 | Hodgkins et al. | |
| 6,248,236 | B1 | 6/2001 | Hodgkins | |
| 6,328,883 | B1 * | 12/2001 | Jensen | 210/136 |
| 6,907,869 | B2 | 6/2005 | Burgess et al. | |
| 7,147,110 | B2 | 12/2006 | Clausen et al. | |
| 2005/0002309 | A1 | 1/2005 | Ogihara | |
| 2005/0023209 | A1 * | 2/2005 | Clausen et al. | 210/436 |
| 2008/0245719 | A1 * | 10/2008 | Beard et al. | 210/235 |

FOREIGN PATENT DOCUMENTS

| | | |
|---|---|---|
| DE | 19538883 | 4/1997 |
| DE | 19716085 | 10/1998 |
| FR | 2822395 | 9/2002 |
| WO | 01/85304 | 11/2001 |
| WO | 02/076568 | 10/2002 |

* cited by examiner

TRI-FLOW FILTER ELEMENT WITH VENTING

This application is a national phase of International Application No. PCT/US2007/069652 filed Dec. 6, 2007 and published in the English language, and which claims priority of U.S. Provisional Application No. 60/803,041 filed May 24, 2006.

CROSS-REFERENCE TO RELATED CASES

The present application claims the benefit of the filing date of U.S. Provisional Application No. 60/803,041 filed May 24, 2006, the disclosure of which is expressly incorporated herein by reference.

FIELD OF THE INVENTION

The present invention relates generally to fluid filters and assemblies, and more particularly to a fuel filter and assembly for a vehicle fuel system.

BACKGROUND OF THE INVENTION

In certain fuel systems, such as for vehicles, a pump is provided to move fuel through the system such as from the tank to the engine. A filter element is sometimes provided downstream (on the pressure side) of the pump to protect downstream components. At start-up and during operation of the system, air can be pushed into the filter housing. It is desirable to vent the accumulated air in the housing to avoid the air being pushed through the element. The air can create erratic fuel delivery, and affect performance of the downstream components.

U.S. Pat. No. 7,147,110 discloses a filter assembly and element for fluid applications which require a purging of air. The drain path for the vented air is provided centrally through the element and more particularly through a separate and independent fluid channel. The fluid channel directs air from a vent orifice in an upper end cap of the filter element to a drain path through a central standpipe or otherwise through the lower end of the housing to a drain port. The vent orifice is integral with the element, and is thereby replaced when the element is replaced to reduce the risk of clogging. The filter element illustrated in this patent provides a primary flow path for the fuel and a drain flow path.

SUMMARY OF THE INVENTION

The present invention provides a novel and inventive filter element and assembly which has three flow paths. The filter element and assembly have particular application to a fuel supply system for a diesel engine for filtering flow from the fuel tank as well as fuel returning from the engine that is to be recirculated back to the engine. Consequently, the filter element and assembly provide a third flow path in a new and inventive manner for filtering the recirculated fuel, while also providing for venting of both fuel paths to a drain flow path internally of the filter element. In addition, the present invention enables this to be done in an manner that involves few parts and low cost.

More particularly, the invention provides a filter element comprising a first ring of filtration media having a first end and a second end and circumscribing a central cavity; a second ring of filter media having a first and a second end, nested within said first ring; an annular support frame between the rings and defining a first flow path between the rings; a first end cap assembly including first and second end cap portions sealingly bonded to the first end of both media rings, respectively, the first end cap assembly including a first vent orifice and a central opening to the central cavity, with the first vent orifice being radially outwardly spaced from the first central opening, and a collection chamber between the end cap portions in fluid communication with the flow path from between the rings, and in fluid communication with the first central opening into the central cavity; a second end cap assembly sealingly bonded to the second end of both media rings, the second end cap assembly having an annular body portion defining a second central opening; an imperforate support core disposed in the central cavity internal of the second media ring between the first and second end cap assemblies and supporting an inner dimension of the second media ring, the support core fluidly separating the second media ring and the central cavity; a fluid drain passage in the support core from a first end in fluid communication with the vent orifice, to a second end, the fluid passage being separate and independent of the flow through the medias; and an annular resilient sealing device carried by the second end cap and bounding the central opening therein, the sealing device including a first through passage fluidly interconnecting the second end of the fluid drain passage with the second central opening in the second end cap, and a second through-passage fluidly interconnecting an inner media surface of the second media ring with the second central opening in the second end cap.

The support core may have a wall forming with the inner media surface a second flow path connected to the first through-passage at is lower end, and the wall of the support core has at its upper end a vent opening for venting of air from the upper region of the second flow path to the fluid drain passage in the support core that may surround the central cavity.

The sealing device may include axially and radially spaced first and second annular sealing portions axially interposed between the first and second through-passages and configured to seal against radially spaced and axially staggered portions of respective standpipe sleeves of a filter housing. The sealing device may further include a third annular sealing portion axially and radially inwardly spaced from the first and second annular sealing portions, and configured to seal against a portion of a standpipe in the filter housing, which standpipe extends through and axially beyond the standpipe sleeves.

According to another aspect of the invention, there is provided a filter assembly comprising the filter element and a housing enclosing the filter element. The housing has first and second portions defining a chamber in which the filter element is disposed, and the first and second portions are removably connected to allow for replacement of the filter element.

The housing may have an inlet port communicating with an annular chamber formed between the outer media ring and inner wall surface of the housing, and an outlet port communicating with a flow passage through a standpipe extending into the central cavity of the filter element.

The filter assembly may comprise radially inner and outer standpipe sleeves, the radially inner standpipe sleeve projecting into the central cavity to a lesser axial extent than the standpipe and defining with the standpipe a fluid drain passage communicating with the fluid drain passage in the support core via the first though-passage, and the radially outer standpipe sleeve projecting into the central cavity to a lesser axial extent than the radially inner standpipe sleeve and defining with the radially inner standpipe sleeve a flow passage communicating with the inner media surface of the second media ring via the second through-passage.

According to a further aspect of the invention, there is provided a filter element comprising first and second concentric rings of filtration media circumscribing a central cavity and radially spaced apart to form therebetween a first flow path between the rings; a first end cap sealingly bonded to a first end of both media rings, the first end cap including a first vent orifice and a passage connecting the first flow path to the central cavity; a second end cap sealingly bonded to the second end of both media rings, the second end cap assembly having an annular body portion defining a central opening to the central cavity; a core disposed in the central cavity internal of the second media ring between the first and second end cap assemblies, the core fluidly separating the second media ring and the central cavity; a fluid drain passage in the support core from a first end in fluid communication with the vent orifice, to a second end, the fluid passage being separate and independent of the flow through the medias; and an annular resilient sealing device including a first through passage fluidly interconnecting the second end of the fluid drain passage with the second central opening in the second end cap, and a second through-passage fluidly interconnecting an inner media surface of the second media ring with the second central opening in the second end cap.

According to still another aspect of the invention, there is provided a filter element with two concentric media rings and respective flow paths each provided with a vent to a drain flow path interiorly of the filter element.

Further features of the invention will become apparent from the following detailed description when considered in conjunction with the drawings.

DETAILED DESCRIPTION

Figure 6:
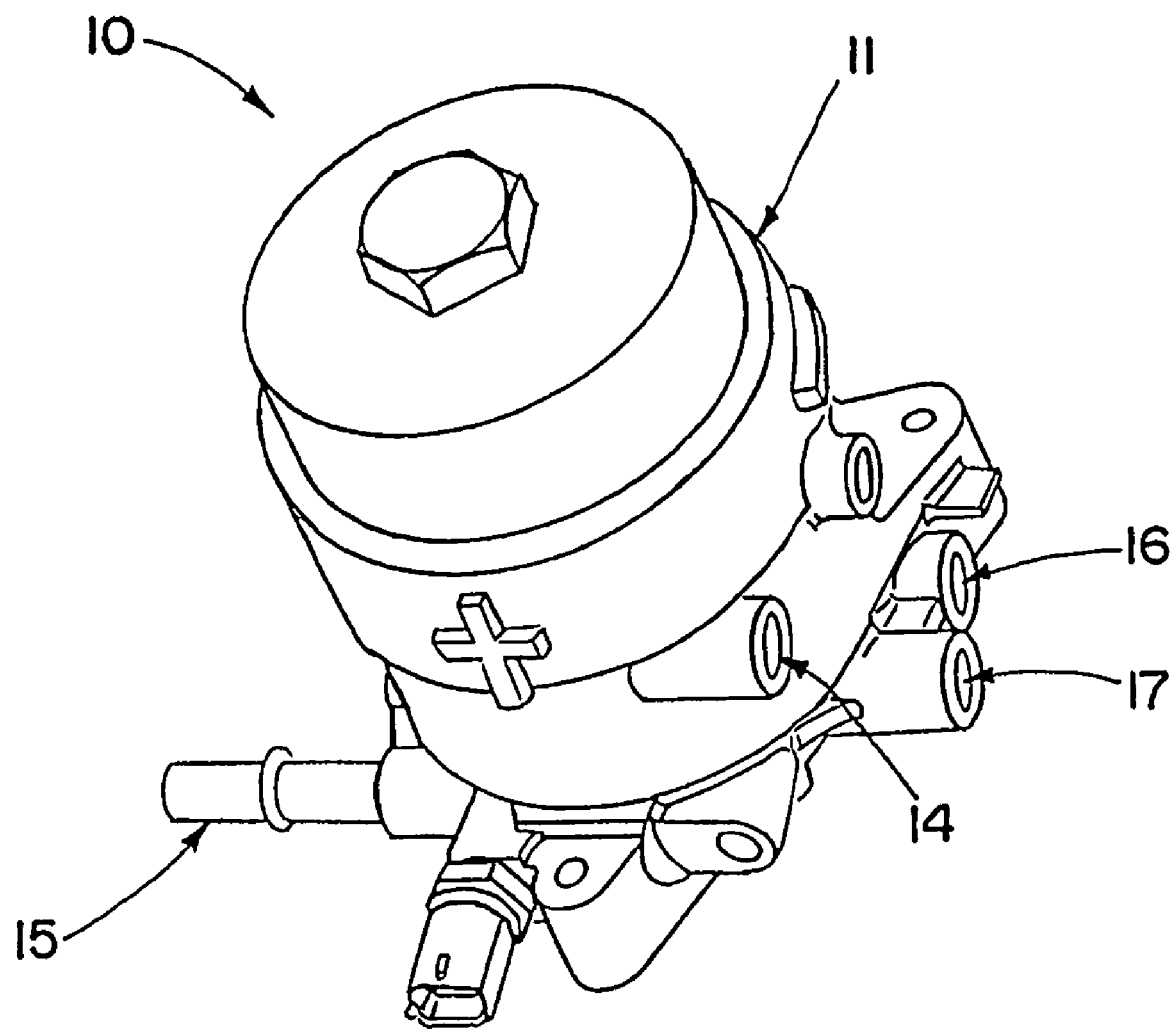
FIG. 6 is a perspective view of the filter assembly.

Referring now in detail to the drawings and initially to FIG. 6, an exemplary filter assembly according to the invention is indicated generally at 10. The filter assembly includes a housing 11 provided with various ports (fluid connections) for circulating through the filter assembly a fluid to be filtered. As the filter assembly has particular application to a fuel supply system for a diesel engine for filtering flow from the fuel tank as well as fuel returning from the engine that is to be recirculated back to the engine, it will be chiefly described in this context. Those skilled in the art, however, will appreciate that the principles of the herein described invention will have application to filtering fuel or other fluids in other applications as well.

Thus, in the context of a fuel supply for a diesel engine, the housing 11 has an inlet port 14 which receives fuel from a fuel tank, typically via a fuel supply pump. The housing also has an outlet port 15 for filtered fuel to be supplied to the engine's internal transfer pump/injection pump. Excess fuel from the engine is returned to the filter assembly through a "recirc" port 16. The housing also has a drain (return) port 17 for return of fuel to the tank. The recirculated fuel typically will be passed through a cooler before being returned to the filter assembly for re-filtering in the below described manner.

Figure 1:
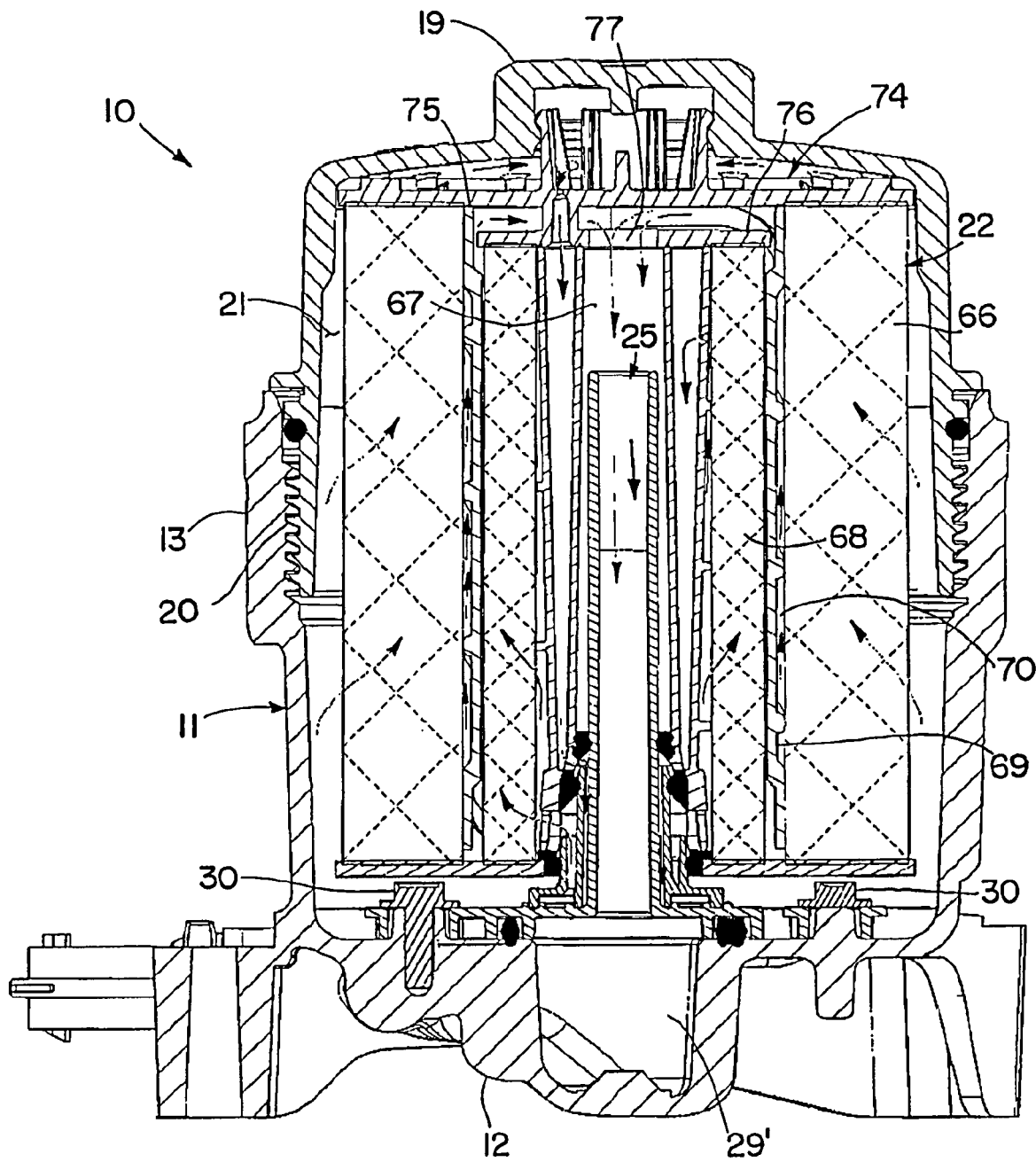
FIG. 1 is a cross-sectional diametral view of an exemplary filter assembly constructed according to the principles of the present invention.
Figure 2:
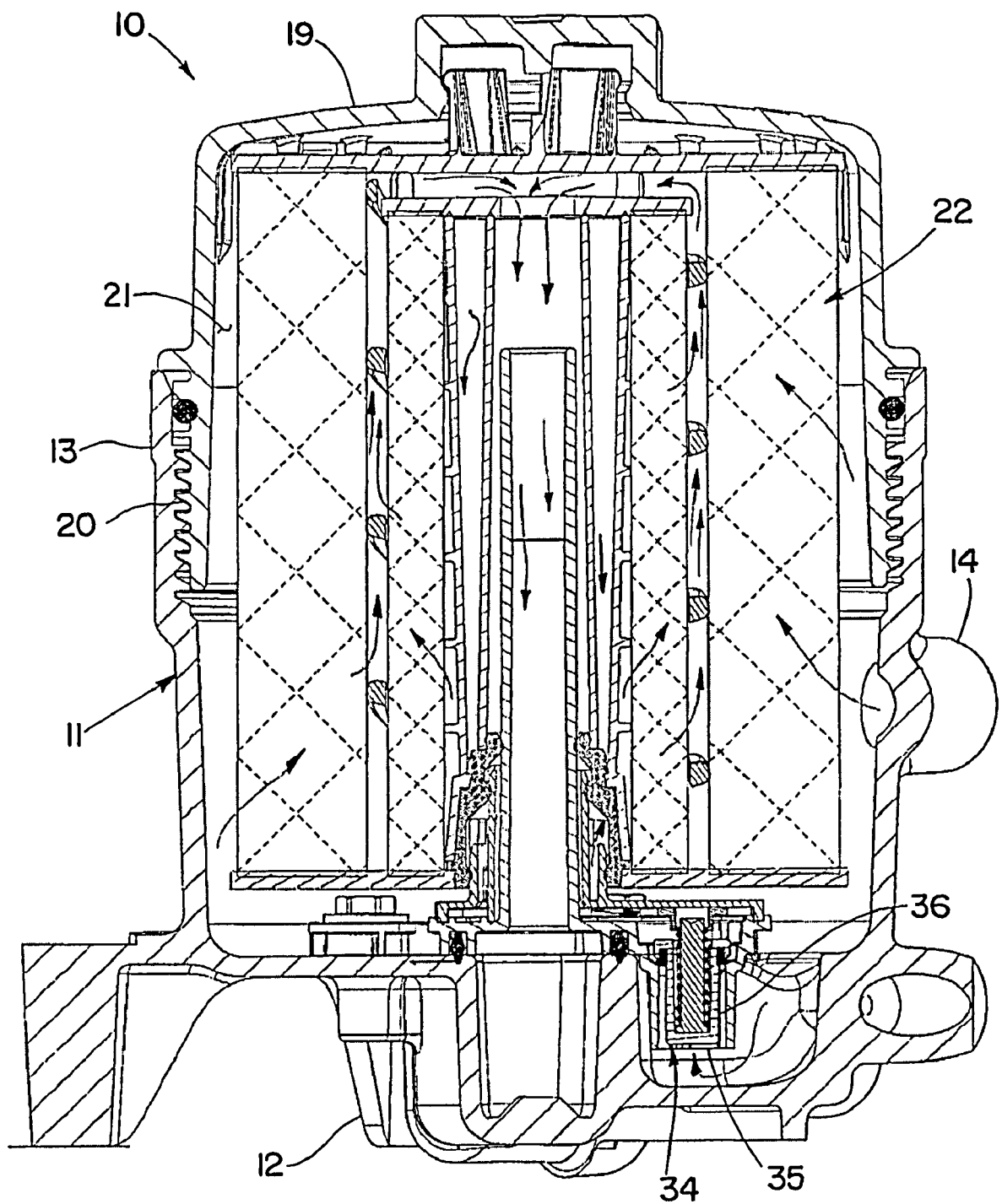
FIG. 2 is a cross-sectional diametral view of a filter assembly, angularly offset from the view plane of FIG. 1.

Turning now to FIGS. 1 and 2, the housing 11 has a lower base portion 12 and an upper canister portion 13 that may be cylindrical. The canister portion has a lower closed end joined to the base portion 12 and an upper open end that is closed by a cover 19 which may be cup-shaped as shown. The cover is removably attached to the open end of the canister portion 13 by suitable means, such as corresponding threaded portions indicated at 20. The cover and canister portion together define an internal chamber 21 for containing a filter element 22. The threaded connection provides for easy screw-on and screw-off attachment of the cover, for facilitating installation and/or replacement of the filter element. The housing, including the cover, may be made of any suitable material.

Figure 5:
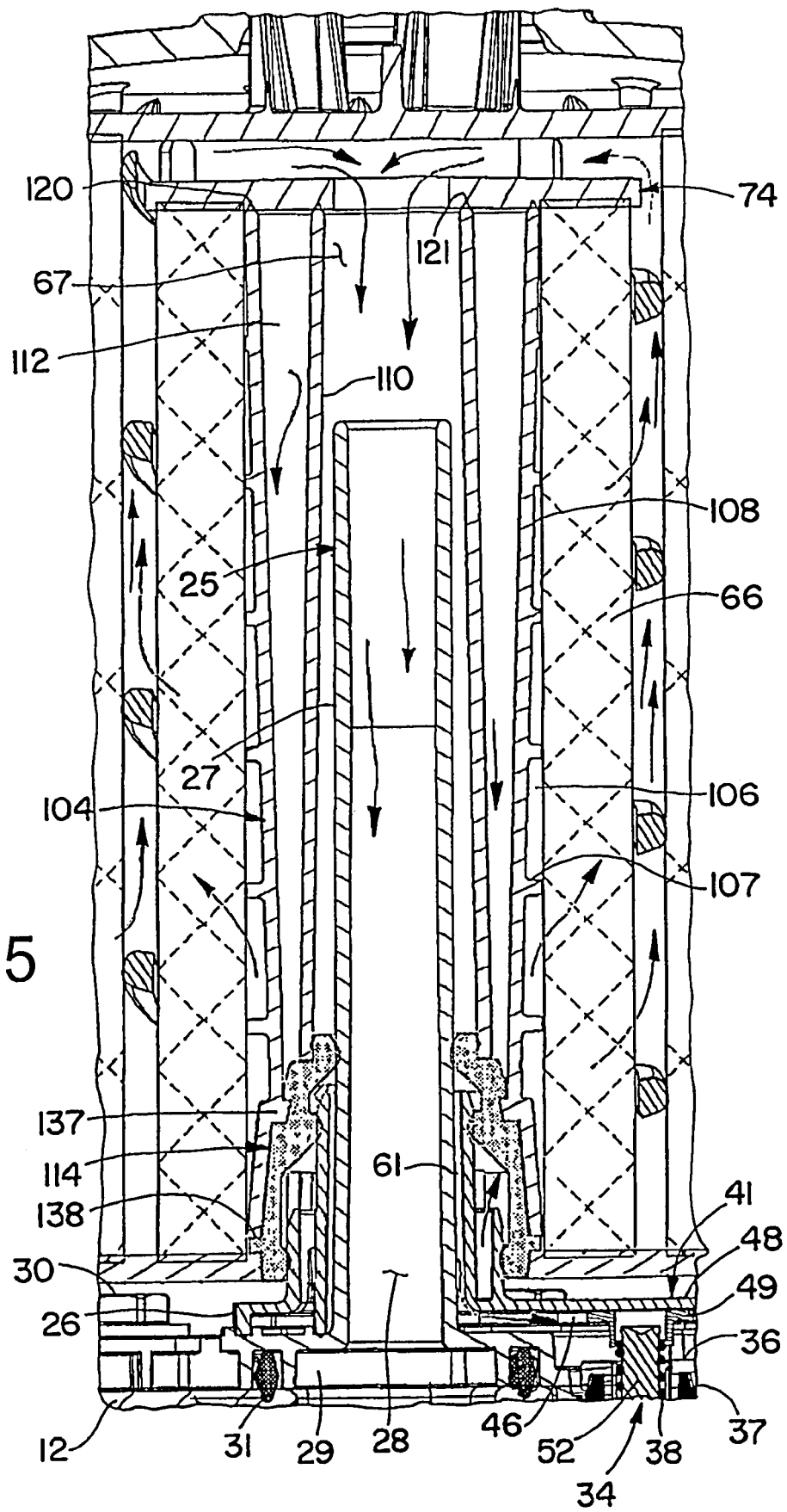
FIG. 5 is an enlargement of a longitudinal central portion of FIG. 2.

The housing 11 at the closed end of the canister portion is provided with a standpipe member 25. As best seen in FIGS. 1, 2, and 5, the standpipe member 25 may be formed as one piece and assembled to the base portion. The illustrated standpipe member has a base 26 and an elongated standpipe 27 centrally located and extending axially upward away from the closed end of the housing towards the open end. The standpipe has a central flow passage 28 that communicates at its lower end with a flow passage 29 in the housing base portion that is connected to the outlet port 15 (FIG. 6). The standpipe base may be assembled to the housing base by suitable fasteners 30, and a suitable seal 31 may be provided to seal the standpipe base to the housing base portion. The standpipe member may be formed from any suitable material, such as metal or molded plastic.

In the illustrated embodiment, the base 26 of the standpipe member 25 carries a pressure regulator valve assembly 34 that allows excess flow to the filter assembly to be bypassed back to the fuel tank. To this end, the valve assembly 34 has an inlet 35 in fluid communication with the inlet port 14. Flow through the valve assembly is controlled by a valve member 36 that is movable into and out of engagement with a valve seat 37. The valve member is biased by suitable means, such as by a coil spring 38, against the valve seat whereby the valve will be held closed unless differential pressure across the valve exceeds the pressure release set point of the valve member. When the pressure set point is exceeded, the valve member will open to allow flow to bypass the filter element and flow directly to the drain port until the pressure drops below the pressure release set point. In a typical operation, though, the pressure regulator valve will continually throttle excess flow to the drain port to maintain a desired pressure differential across the filter element.

The standpipe 27 at its lower end is surrounded by a standpipe sleeve member 41. The standpipe sleeve member has a base portion 42 provided at its bottom side with depending ribs 43 that mate in grooves formed in the top surface of the standpipe base 26. The ribs hold a top wall of the base portion spaced from the top surface of the standpipe base so as to form first and second chambers 45 and 46 that are fluidly isolated from one anther by spacer ribs interposed therebetween. The first chamber 45 communicates with the recirc port 16 via passage in the housing base, and the second chamber 46 communicates with the drain port 17. As seen in FIGS. 2 and 5, the base of the standpipe sleeve member may have a radially extending portion 48 that overlies the pressure regulator valve 34 and thereby functions to hold the valve in place in the base portion of the standpipe member. To this end, a spring retainer 49 has an annular flange portion trapped between the sleeve base and standpipe base. The spring retainer further has a tubular portion depending from the flange portion, which tubular portion has at its bottom end a central opening for accommodating telescoping movement of a guide member 52 that is surrounded by the spring 38. The guide member is held by the spring against the bottom of a cup-shape central portion of the valve member 36.

Figure 4:
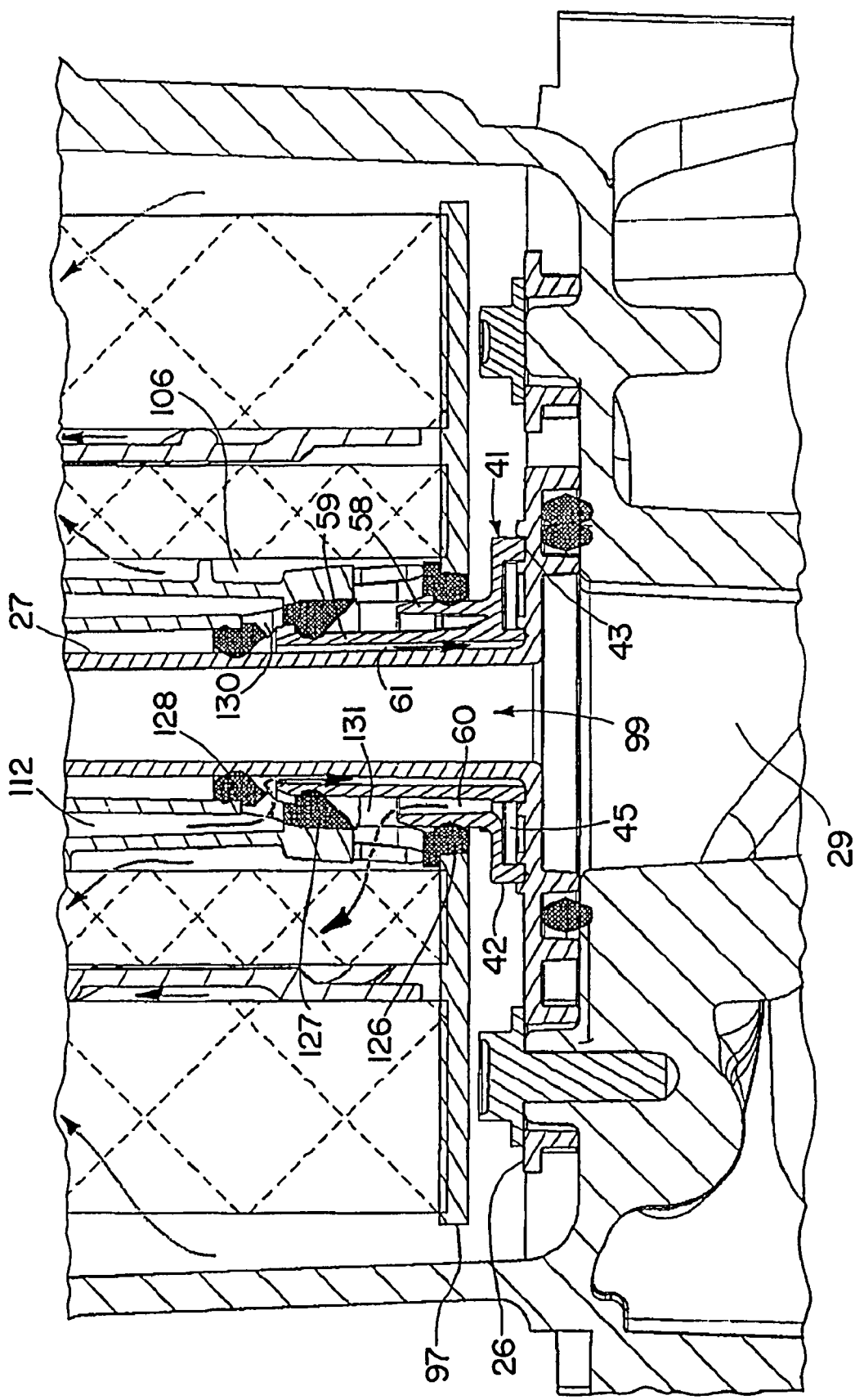
FIG. 4 is an enlargement of the lower portion of FIG. 1.

The standpipe sleeve member 41 also has radially outer and inner standpipe sleeves 58 and 59 extending upwardly from the sleeve base portion 42. The radially outer sleeve is radially spaced from the radially inner sleeve to form a flow passage 60 that communicates with the first chamber 45 as seen in FIG. 4, and thus communicates with the recirc port. The radially inner sleeve extends axially beyond the outer sleeve and is radially spaced from the standpipe to form a flow passage 61 that communicates with the second chamber 46 as seen in FIG. 5, and thus with the drain port.

The standpipe sleeve member 41 may be formed from any suitable material, such as metal or molded plastic. The standpipe sleeve member may be joined to the standpipe base member by suitable means such as by an adhesive, welding, ultrasonic welding if both parts are made of plastic, etc.

Referring to FIGS. 1-5, the filter element 22 comprises a first or outer ring of filtration media 66 circumscribing a central cavity 67, and a second or inner ring of filter media 68 nested within the first ring and also surrounding the central cavity 67. An annular outer support core/frame/tube 69 is interposed between the rings and defines a flow path 70 between the rings. The media rings each may be formed from the same or different materials having an efficiency and structure (pleated, blown, etc.) appropriate for the particular application. The support core, which may extend along the entire length of the media, may be a cylindrical frame structure having a series of annular, lateral support members, grooves, and/or apertures the cooperate to radially support the media rings while also providing a flow path for the fuel that has passed through the media rings. The support core could have other configurations other than that illustrated. It is also possible that if the media rings have sufficient internal support thereby avoiding the need for a support core.

An upper end cap 74 includes upper and lower end cap portions 75 and 76 having annular flange portions sealingly attached to the upper ends of the media rings 66 and 68, respectively, by suitable means, such as bonding by using a potting compound, heat bonding, etc. In the illustrated embodiment, the bottom of the plastic end cap 74 is melted and then the media and herein described support tubes are pressed into the melted surface before it hardens. Once hardened, the media and support tubes will be fixed to the end cap.

Figure 3:
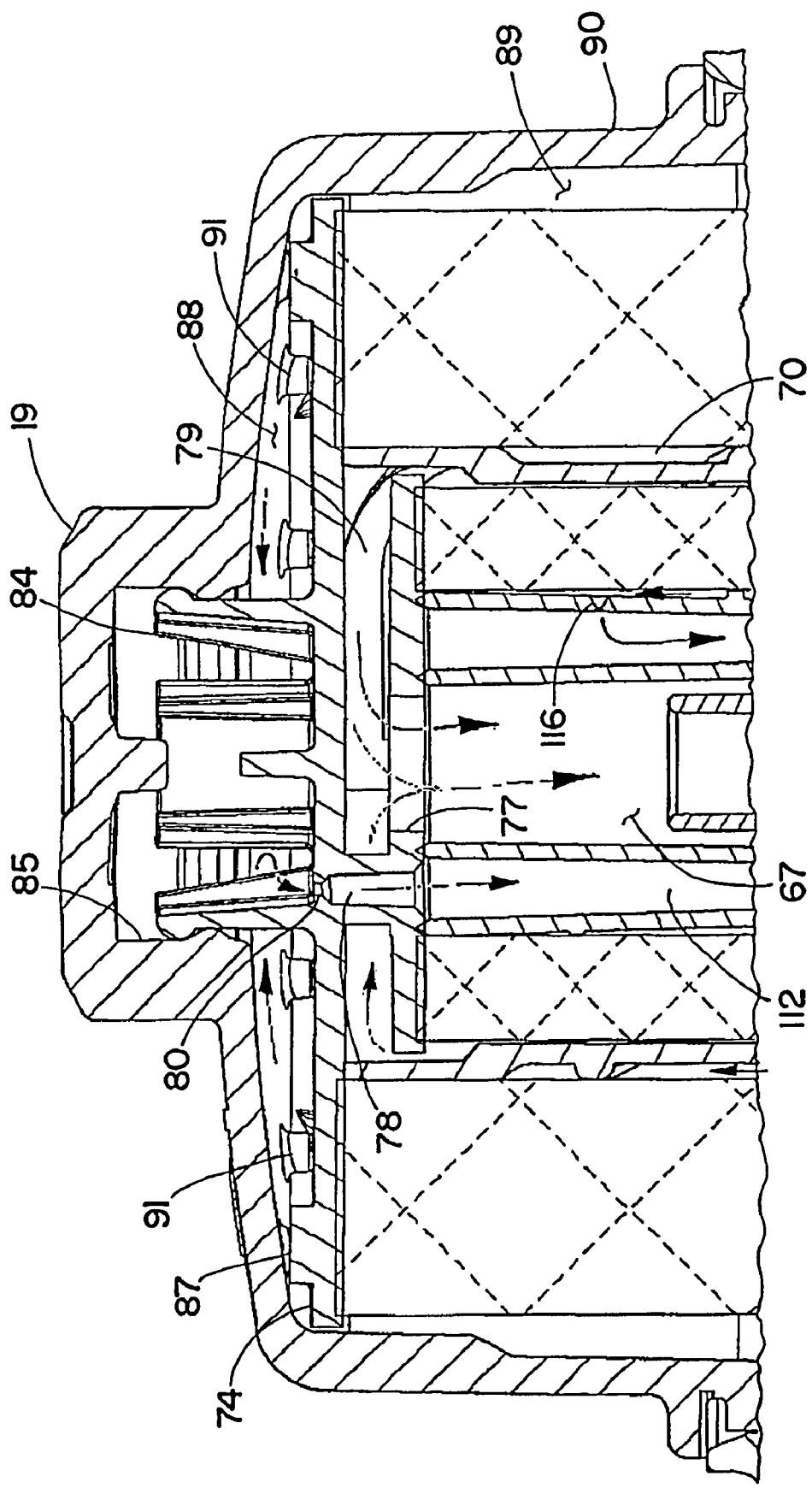
FIG. 3 is an enlargement of the upper portion of FIG. 1.

The lower end cap portion 76 includes a central opening 77 to the central cavity 67, and a main flow vent 78 is provided in the upper end cap assembly at a location radially outwardly spaced from the central opening as seen in FIG. 3. A collection chamber 79 is provided between the end cap portions and the collection portion is in fluid communication with the flow path 70 between the rings, and in fluid communication with the central cavity 67 via the central opening 77. The main flow vent is provided with a vent orifice 80 that can vary in size depending upon the application, however in one application the vent orifice may be an opening having a diameter of between about 0.018 and about 0.020 inches.

The upper end cap 74 may be provided with a plurality of flexible fingers 84 that project axially upward and radially outwardly for temporary locking engagement with appropriate geometry (tabs, grooves, etc.) on the inside surface of a well 85 in the cover 19. The top side of the end cap assembly also is provided with an annular spacer rib 87 for engaging the cover and defining a space 88 above the filter element. This space communicates with an annular chamber 89 formed between the radially outer surface of the outer filter media 66 and the wall 90 of the housing that surrounds the filter element. To provide for such communication, the rib has one or more recesses 91 for allowing flow from the outer chamber 89 to the upper space or chamber 88. The outer chamber receives fuel from the inlet port 14 formed in the side wall 90 of the housing. Air in the incoming fuel will accumulate in the upper space 88 and be discharged via the main flow vent 78 in the upper end cap, as further discussed below. The spacer rib 87 also engages the cover 19 to hold the filter element in proper place.

A lower end cap 97 has an imperforate annular body portion sealingly attached to the bottom ends of the media rings by suitable means, such as a potting compound or by heat bonding as above described in connection with the upper end cap. The lower end of the outer support tube 69 may be similarly bonded to the lower end cap. The annular body portion defines a central opening 99 for receiving the standpipe and standpipe sleeves, as further described below.

The end caps may be formed in one piece (unitary) from appropriate material, e.g., plastic, using conventional processes.

An imperforate core 104, herein also referred to as an inner support core of center tube, is disposed internal of the inner media ring 66 between the upper and lower end caps. The core 104, which may support an inner dimension of the inner media ring, defines with the inner media a recirc flow path 106, i.e. a flow path between the support core and inner dimension of the inner media ring. To this end, the core may have radially protruding ribs 107 on a radially outer wall 108 thereof. The radially outer wall 108 may be tapered as shown in FIG. 1 and the ribs may have progressively greater radial thickness, whereby the recirc flow passage 106 tapers going from bottom to top. A radially inner wall 110 of the support core fluidly separates the recirc flow path 106 from the central cavity 67 of the filter element that is bounded by the support core. The support core also has a fluid drain passage 112 extending from the main flow vent 78 to a lower end of the support core where an annular resilient sealing device 114 is provided. As seen in FIG. 3, the support core is also provided with a recirc flow vent orifice or orifices 116 in the outer wall 108 thereof near the top of the support core. Like the main flow vent orifice, the recirc vent flow orifice can vary in size depending upon the application, however in one application the vent orifice may be an opening having a diameter of between about 0.018 and about 0.020 inches. As will be appreciated, air in the recirc flow passage will accumulate towards the upper end thereof and be discharged through the vent orifice as described below in greater detail.

The upper ends of the inner and outer walls 110 and 108 of the inner core 104 may be attached to the upper end cap 74 by any suitable means, such as by an adhesive, although in the illustrated embodiment the upper end of the inner core 104 is heat bonded to the upper end cap as above described. Those skilled in the art will appreciate that other attachment techniques may be employed, such as providing the bottom surface of the upper end cap with recesses to receive and properly locate the upper ends of the inner core walls during assembly of the filter element, which recesses can serve to provide the requisite connection even in the absence of an adhesive or other bonding. In an alternative embodiment, the upper end cap can be made of a sufficiently soft material such that upper edges 120 and 121 of the walls, that may be tapered, bite into the upper end cap not only to secure the core in place but further to effect a seal. The inner and outer walls 110 and 108 may be formed as a unitary piece or by separate tubular members.

In the illustrated embodiment, the lower end of the inner wall 108 of the center core 104 terminates short of the lower end of the outer wall 108 that continues downwardly and is configured for receiving a sealing device 114. The sealing device 114 is thus carried by the inner core 104 and also by the lower end cap 97. The sealing device, which bounds the central opening 99 in the lower end cap, has three sealing portions 126, 127 and 128 that are axially spaced apart and, in the illustrated embodiment, are of progressively smaller radially inner diameter going from bottom to top. The lower sealing portion 126 seals the central opening in the lower end cap to the outer standpipe sleeve 58. The intermediate sealing portion 127 seals a lower end portion of the support core to the inner standpipe sleeve 59 at a location spaced above the outer standpipe sleeve. The upper sealing portion 128 seals the support core to the standpipe 27 at a location axially spaced above the inner standpipe sleeve.

The sealing device 114 includes upper and lower through-passages 130 and 131 that are axially spaced apart along the length of the sealing device and further are generally aligned with annular spaces formed between the upper, intermediate and lower sealing portions. The upper through-passage or passages 130 fluidly connect the drain flow passage 112 in the support core to the flow passage 61 formed between the inner standpipe sleeve and the standpipe. The lower through-passage or passages 131 fluidly connect the recirc flow path 106 between in the inner media ring and support core to the flow passage 60 formed between the outer and inner standpipe sleeves.

In an alternative embodiment, the upper, intermediate and lower sealing portions can be formed by discrete seals fitted on the inner core, rather than as one piece as shown. If discrete seals, such as O-rings are used, the axial spacing between the O-rings form the above-mentioned through-passages.

Figure 7:
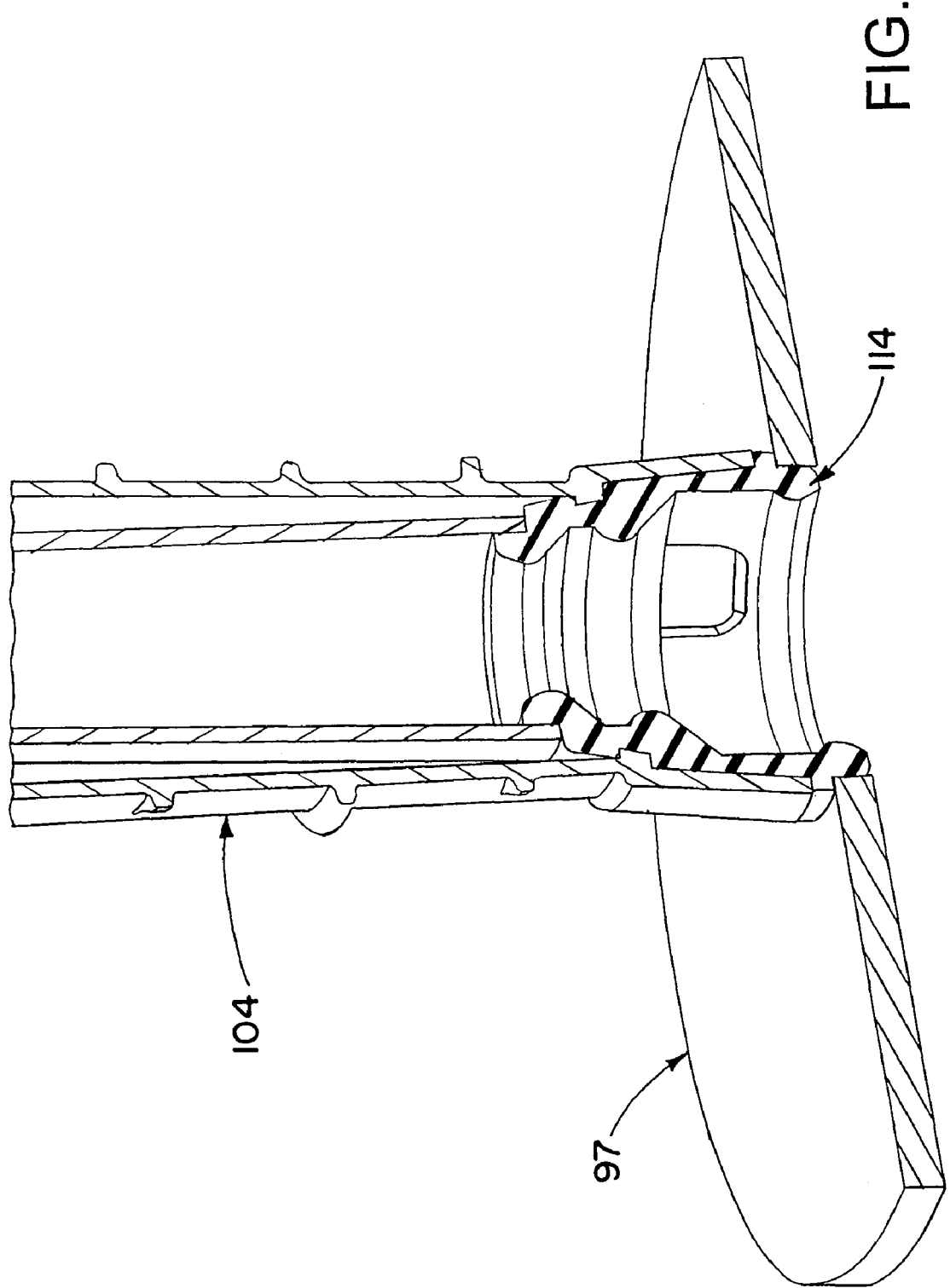
FIG. 7 is a fragmentary perspective view, partly broken away in section, illustrating the union between the center or core tube, lower end cap and sealing device.

As best seen in FIGS. 5 and 7, the inner diameter surface of the outer wall of the center core may be provided with a radial inwardly protruding locking element 137 for interacting with an annular groove in the outer diameter surface of the sealing device, thereby to provide an a mechanical axial interlock between the sealing device and core for holding the sealing device to the core and in proper position. The lower end of the sealing device has a pilot portion received in the central opening 99 in the lower end cap for locating the sealing device relative to the end cap and further for effecting a seal therebetween. When the end caps are assembled to the media rings, the sealing device will be sandwiched between the center tube end the lower end cap. The sealing device may also be provided with a sealing flange 138 for sealing between the outer wall of the center tube and the lower end cap about the periphery of the center opening in the lower end cap.

As also seen in FIG. 5, the radially inner sides of the sealing portions are rounded to provide an O-ring-like seal to the surfaces of the standpipe and standpipe sleeves against which they seal.

The sealing device 114 can be made of any resilient or pliant material appropriate for the particular application, and is preferably a member formed from an elastomeric material. While the sealing device is shown as being formed in one piece (unitary), it is possible the device could be formed of multiple pieces, connected to each other or even slightly separated, with a spaces or gaps between the sealing portions that define the through-passages. In these cases, portions of the sealing device could be formed of relatively rigid materials, as long as appropriate portions of the sealing device were resilient to provide a seal with the standpipe.

As should be apparent from the above, the filter element 22 may be installed in the filter housing 11 by inserting the filter element into the canister portion when the cover 19 is removed. The filter element, if desired, may first be assembled to the cover using the resilient fingers 84 as above described. During such installation, the sealing device will be telescoped over to effect the above described seals to the standpipe 27 and standpipe sleeves 58 and 59. The installation is completed when the cover has been tightened onto the canister portion of the housing. Removal of the filter element can be effected essentially in reverse manner.

When the filter element 22 is installed in the housing, and fluid to be filtered that is introduced through the inlet port, flows around the periphery of the filter element and radially-inward through the outer media ring 66, where particulates and other contaminants are separated. The clean fluid then passes through upwardly through the passage 70 between the inner and outer media rings and into the collection chamber 79 in the upper end cap 74 and then into the central cavity 67 for passage out through the flow passage 29 in the lower housing portion connected to the outlet port 15. Any air in the incoming fluid has a tendency to rise to the upper portion of the housing and into the upper chamber 88, where the air can then pass through vent 78, 80 in the upper end cap and down through the drain passage 112 in the inner core 104, then through the chamber 45 and out through the drain port 17. Normally, some of the inlet flow will be bypassed to the drain port by the relief valve assembly 34, and the air will be drained along with the bypass flow back to the fuel tank. The vent orifice may be sized as appropriate to allow sufficient air to pass to the drain port, and yet is preferably small enough to prevent significant fluid leakage.

The fuel returning to the filter assembly is received at the recirc port 16 and directed via chamber 45 to the flow passage 70 between the inner core 104 and the inner media ring 68. From there the fuel will flow outwardly through the inner media ring. The filtered fuel will mix with the flow leaving the outer media ring for flow out through the outlet port. Any air in the incoming fluid has a tendency to rise to the flow passage between the inner core and inner media ring for passage through the vent opening or openings 116 in the inner wall of the inner core for mixing with the return flow in the drain flow passage in the inner core and ultimate discharge through the drain port. The vent opening may be sized as appropriate to allow sufficient air to pass to the drain port, and yet is preferably small enough to prevent significant fluid leakage.

When the filter element 22 is removed from the housing 11 (by removing cover 19) when the element becomes spent, and replaced with a fresh element, the vent orifices/openings likewise will be replaced, as they are an integral component with the element. This reduces the chance that the orifice will become clogged over time, thereby preventing air in the housing to vent to the drain port.

As described above, the present invention thereby provides a novel and inventive filter assembly and element for fluid applications which require three or more flow paths, a purging of air from inlet flow paths, and/or a simple, low cost design.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element, comprising
a first ring of filtration media having a first end and a second end and circumscribing a central cavity;
a second ring of filter media having a first and a second end, nested within said first ring;
an annular support frame between the rings and defining a first flow path between the rings;
a first end cap including first and second end cap portions sealingly bonded to the first end of both media rings, respectively, the first end cap including a first vent orifice and a central opening to the central cavity, with the first vent orifice being radially outwardly spaced from the first central opening, and a collection chamber between the end cap portions in fluid communication with the first flow path from between the rings, and in fluid communication with the first central opening into the central cavity;
a second end cap sealingly bonded to the second end of both media rings, the second end cap having an annular body portion defining a second central opening;
an imperforate support core disposed in the central cavity internal of the second media ring between the first and second end caps and supporting an inner dimension of the second media ring, the support core fluidly separating the second media ring and the central cavity;
a fluid drain passage in the support core extending from a first end in fluid communication with the first vent orifice, to a second end, the fluid passage being separate and independent of the first flow path; and
an annular resilient sealing device carried by the second end cap and bounding the central opening therein, the sealing device including a first through passage fluidly interconnecting the second end of the fluid drain passage with the second central opening in the second end cap, and a second through-passage fluidly interconnecting an inner media surface of the second media ring with the second central opening in the second end cap.

2. A filter element as set forth in claim 1, wherein the support core has a wall forming with the inner media surface a second flow path connected to the first through-passage at is lower end, and the wall of the support core has at its upper end a second vent orifice for venting of air from the upper region of the second flow path to the fluid drain passage in the support core.

3. A filter element as set forth in claim 1, wherein the sealing device includes axially and radially spaced first and second annular sealing portions axially interposed between the first and second through-passages and configured to seal against radially spaced and axially staggered portions of respective standpipe sleeves of a filter housing.

4. A filter element as set forth in claim 3, wherein the sealing device includes a third annular sealing portion axially and radially inwardly spaced from the first and second annular sealing portions, and configured to seal against a portion of a standpipe in the filter housing, which standpipe extends through and axially beyond the standpipe sleeves.

5. A filter element as set forth in claim 1, wherein the support core includes radially inner and outer walls forming therebetween the fluid drain passage.

6. A filter element as set forth claim 1, wherein the support core surrounds the central cavity.

7. A filter element as set forth in claim 1, wherein the outer dimension of the inner media ring communicates with the first flow path.

8. A filter element as set forth in claim 1, wherein the support core extends between the first and second end caps.

9. A filter element as set forth in claim 1, wherein the support core is sealed at both ends to the first and second end caps.

10. A filter element as set forth in claim 1, wherein the support core receives the sealing device at its lower end.

11. A filter element as set forth in claim 1, wherein the sealing device has a radially-enlarged first circumferential portion axially spaced from a radially-reduced second circumferential portion that in turn is axially spaced from a further radially-reduced third circumferential portion.

12. A filter element as set forth in claim 11, wherein the first circumferential portion has an exposed inner cylindrical surface capable of sealing against a first cylindrical housing portion received internally of the first circumferential portion, the second circumferential portion has an exposed inner cylindrical surface capable of sealing against a second cylindrical housing portion received internally of the second circumferential portion, the third circumferential portion has an exposed inner cylindrical surface capable of sealing against a third cylindrical housing portion received internally of the third circumferential portion.

13. A filter element as set forth in claim 12, wherein the sealing device is a single piece having a frustoconical configuration.

14. A filter assembly comprising the filter element of claim 1, and a housing enclosing the filter element, the housing having a first and second portions defining a chamber in which the filter element is disposed, and wherein the first and second portions are removably connected to allow for replacement of the filter element.

15. A filter assembly as set forth in claim 14, wherein the housing has an inlet port communicating with an annular chamber formed between the outer media ring and inner wall surface of the housing, and an outlet port communicating with a flow passage through a standpipe extending into the central cavity of the filter element.

16. A filter assembly as set forth in claim 15, further comprising radially inner and outer standpipe sleeves, the radially inner standpipe sleeve projecting into the central cavity to a lesser axial extent than the standpipe and defining with the standpipe a fluid drain passage communicating with the fluid drain passage in the support core via the first though-passage, and the radially outer standpipe sleeve projecting into the central cavity to a lesser axial extent than the radially inner standpipe sleeve and defining with the radially inner standpipe sleeve a flow passage communicating with the inner media surface of the second media ring via the second through-passage.

17. A filter element, comprising
a first and second concentric rings of filtration media circumscribing a central cavity and radially spaced apart to form therebetween a first flow path between the rings;

a first end cap sealingly bonded to a first end of both media rings, the first end cap including a first vent orifice and a passage connecting the first flow path to the central cavity;

a second end cap sealingly bonded to the second end of both media rings, the second end cap having an annular body portion defining a central opening to the central cavity;

a support core disposed in the central cavity internal of the second media ring between the first and second end caps, the core fluidly separating the second media ring and the central cavity;

a fluid drain passage in the support core from a first end in fluid communication with the vent orifice, to a second end, the fluid passage being separate and independent of the flow through the medias; and an annular resilient sealing device including a first through passage fluidly interconnecting the second end of the fluid drain passage with the second central opening in the second end cap, and a second through-passage fluidly interconnecting an inner media surface of the second media ring with the second central opening in the second end cap.

18. A filter element as set forth in claim 17, wherein the support core forms with the inner media surface a second flow path connected to the first through-passage at its lower end, and the support core has at its upper end a vent opening for venting of air from the upper region of the second flow path to the fluid drain passage in the support core.

* * * * *